United States Patent
Beauprez

(10) Patent No.: US 6,692,154 B2
(45) Date of Patent: Feb. 17, 2004

(54) UNIT CONSISTING OF A BEARING WITH INSTRUMENT AND A HOUSING JOINED BY A MONOBLOCK SENSOR

(75) Inventor: Jean-Michel Beauprez, Menthonnex sous Clermont (FR)

(73) Assignee: SNR Roulements, Annecy Cedex (FR)

( * ) Notice: Subject to any disclaimer, the term of this patent is extended or adjusted under 35 U.S.C. 154(b) by 43 days.

(21) Appl. No.: 10/138,167

(22) Filed: May 2, 2002

(65) Prior Publication Data

US 2002/0181815 A1 Dec. 5, 2002

(30) Foreign Application Priority Data

May 4, 2001 (FR) .............................. 01 06021

(51) Int. Cl.[7] .............................................. F16C 19/52
(52) U.S. Cl. ..................................................... 384/448
(58) Field of Search ........................ 384/448; 324/173, 324/174, 207.25

(56) References Cited

U.S. PATENT DOCUMENTS

| | | | |
|---|---|---|---|
| 5,140,261 A | 8/1992 | Seo et al. | 324/173 |
| 5,172,054 A | 12/1992 | Nohara et al. | 324/166 |
| 5,927,867 A * | 7/1999 | Niebling et al. | 384/448 X |

FOREIGN PATENT DOCUMENTS

| | | | |
|---|---|---|---|
| FR | 2704285 | | 10/1994 |
| GB | 2207470 | * | 2/1989 |
| WO | WO 00/62079 | * | 10/2000 |

* cited by examiner

*Primary Examiner*—Thomas R. Hannon

(57) ABSTRACT

A unit consisting of a bearing equipped with a data sensor device and a housing in which the bearing is coupled. The bearing consists of an inner turning collar designed to be attached to a turning body, an outer fixed collar coupled to the housing, and rolling bodies positioned between them. The data sensor device consists of a coder that generates magnetic impulses attached to the turning collar and, attached to the fixed collar, a sensor equipped with at least two sensitive components capable of detecting such impulses. The housing is designed to permit said bearing to be locked radially and to lock the bearing axially in one direction. The sensor is made in monoblock construction and configured such that the bearing is locked at least in the other direction.

12 Claims, 3 Drawing Sheets

UNIT CONSISTING OF A BEARING WITH INSTRUMENT AND A HOUSING JOINED BY A MONOBLOCK SENSOR

BACKGROUND

The invention concerns a unit consisting of a bearing equipped with a data sensor device and a housing inside which the bearing is coupled.

Such units permit, on the one hand, a turning body to rotate by attaching it to a turning collar and, on the other hand, the bearing and the body to be locked in position in relation to the housing.

The invention likewise concerns a steering system for an automobile consisting of a steering column coupled to the inner collar of such a unit and a steering tube in which the housing is formed to receive said column in rotation.

In such units, when the bearing is equipped with a device to detect rotating speed, angular position, and/or the rotating direction of the turning collar in relation to the fixed collar, the data may be converted into signals as a function of the torque exerted on the column by means of the steering wheel, which signals are used by a power steering computer.

In another example of an application, such units are used for automobile vehicle wheels that are equipped with anti-lock systems; the data are then used, in particular, by a power brake computer.

Bearings equipped with a data sensor device consisting of a coder that generates magnetic impulses attached to the turning collar and a sensor equipped with at least two sensitive components capable of detecting such impulses attached to the fixed collar are already known.

In addition, document U.S. Pat. No. 5,927,867 speaks of an attachment device consisting of a casing provided with projections, with said casing being coupled to the outer collar of the bearing with the projections fitting into a groove provided in the housing. In one mode of embodiment, the casing carries the sensor.

This mode of embodiment presents a number of disadvantages.

Specifically, it requires that a special casing be made for each type of sensor, or vice versa.

In addition, making the device in two separate pieces complicates assembly, which is undesirable, particularly in light of current production rates in the automobile industry.

Furthermore, it does not allow for the bearing to be attached securely enough inside the housing. In fact, the attachment is achieved merely by a housing seat that receives all of the stresses exerted by the bearing.

Finally, because the sensor is attached to the casing, which is capable of moving particularly in rotation under the effect of the stresses exerted on it, this mode of embodiment does not ensure precise positioning of the sensor in relation to the coder.

Also, particularly for safety applications such as anti-lock brakes or power steering, the sensor must be precisely and securely joined to the bearing in order for the sensitive components to always be opposite and at a distance from the coder.

SUMMARY

The present invention provides a unit in which the sensor is made in monoblock construction with the bearing locking means inside the housing, with said means securely locking the bearing with the sensitive components of the sensor positioned precisely and securely opposite and at a distance from the coder.

To that end, and according to a first feature, the invention proposes a unit consisting of a bearing equipped with a data sensor device and a housing in which said bearing is coupled, in which:

said bearing consists of an inner turning collar designed to be attached to a turning body, an outer fixed collar coupled in the housing, and rolling bodies positioned between them;

said data sensor device consists of a coder that generates magnetic impulses attached to the turning collar and, attached to the fixed collar, a sensor equipped with at least two sensitive components capable of detecting such impulses;

said housing is designed to permit said bearing to be locked radially;

said housing has a first means to lock the bearing axially in one direction;

in which the sensor is made in monoblock construction with the second means to lock the bearing, with the second means being designed to work with the additional means provided in the housing to ensure that the bearing is locked in at least the other direction.

According to a second feature, the invention proposes an automobile steering system consisting of a steering column coupled to the inner collar of such a unit and a steering tube that receives said column in rotation, in which the housing is formed in the tube.

Other purposes and advantages of the invention will be revealed in the description that follows, made with reference to the attached drawings.

DETAILED DESCRIPTION OF THE PREFERRED EMBODIMENTS

Figure 1:
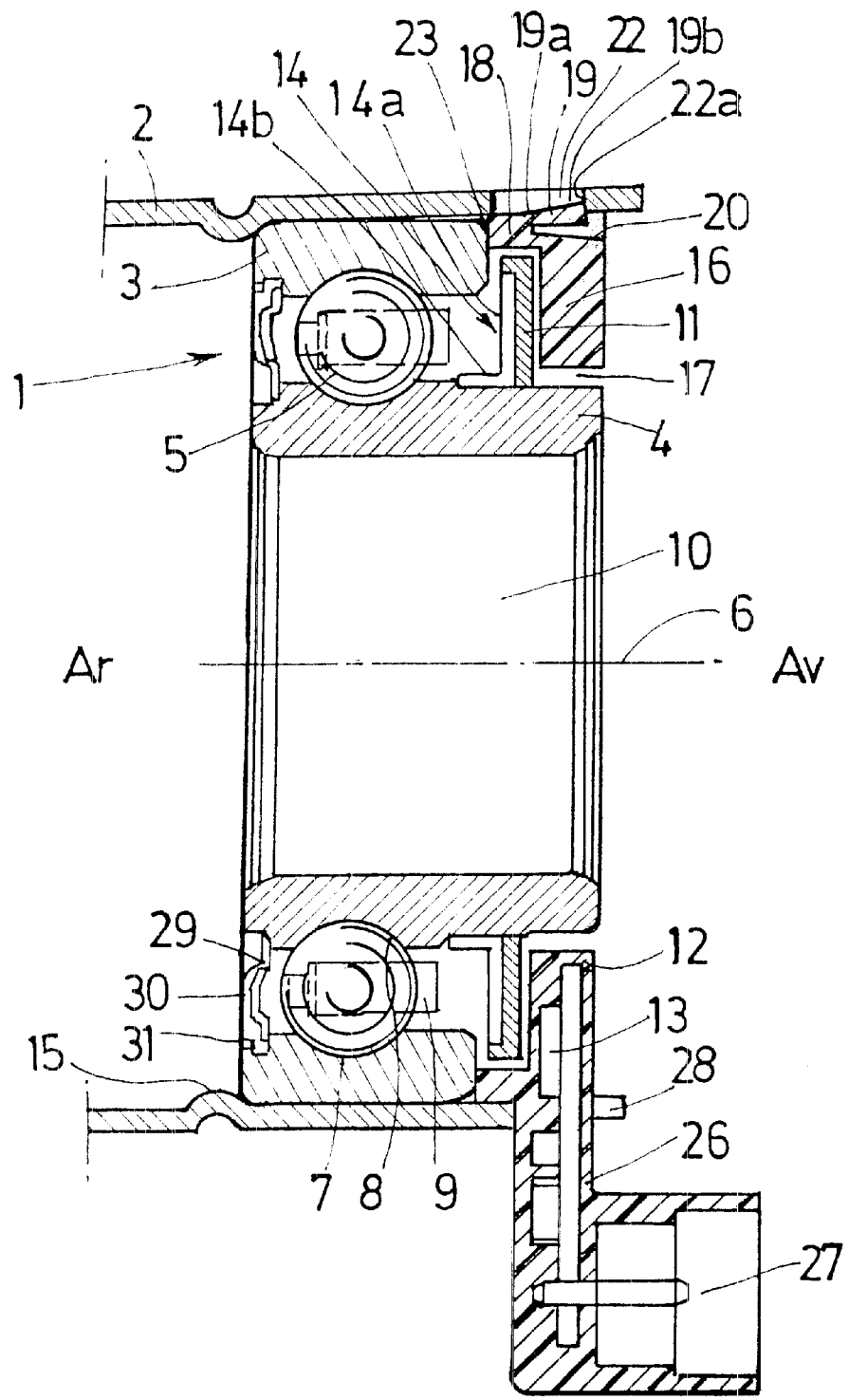
FIG. 1 is a lengthwise cross section of a first mode of embodiment of the unit according to the invention.
Figure 2:
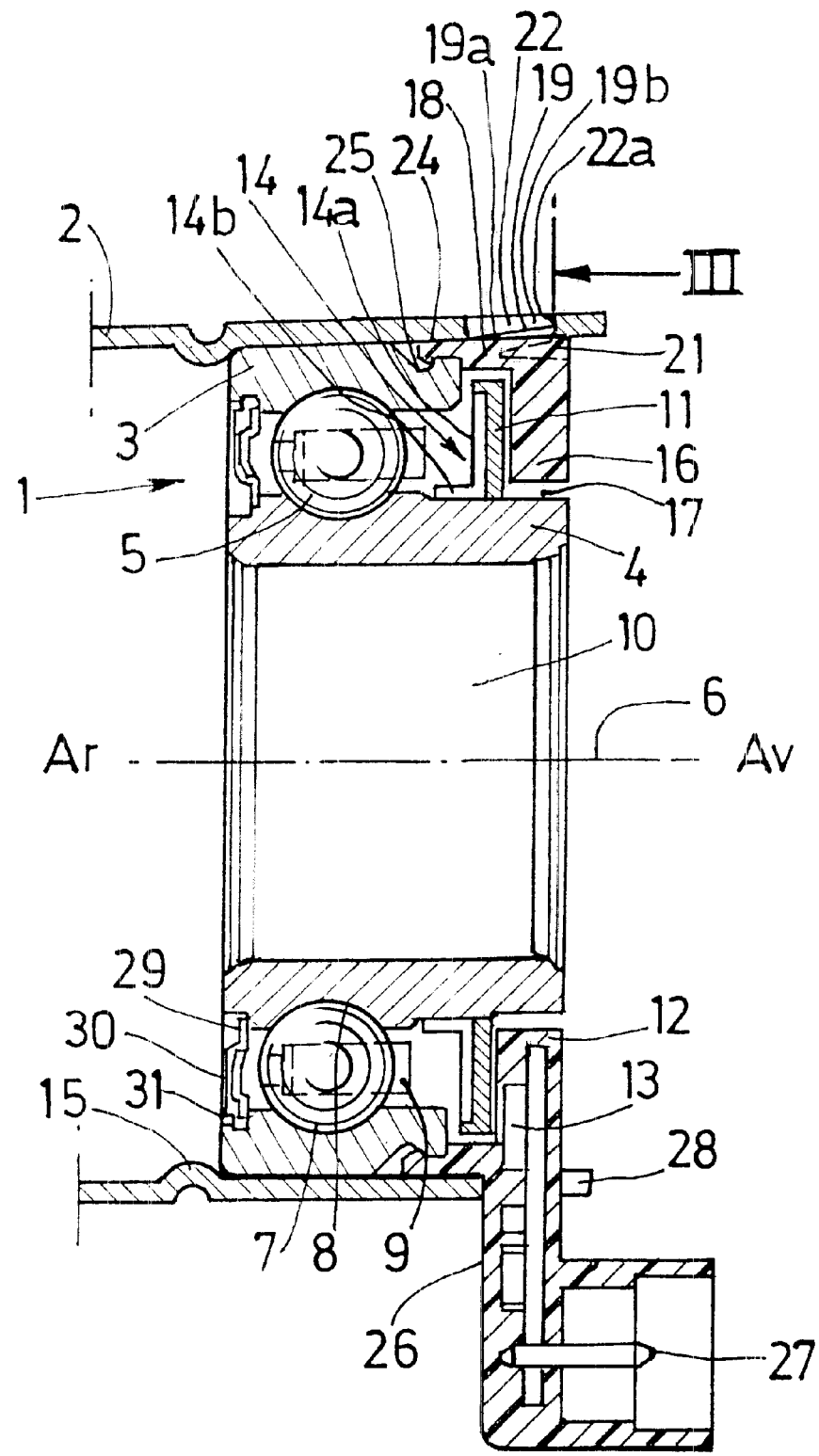
FIG. 2 is a lengthwise cross section of a second mode of embodiment of the unit according to the invention.
Figure 3:
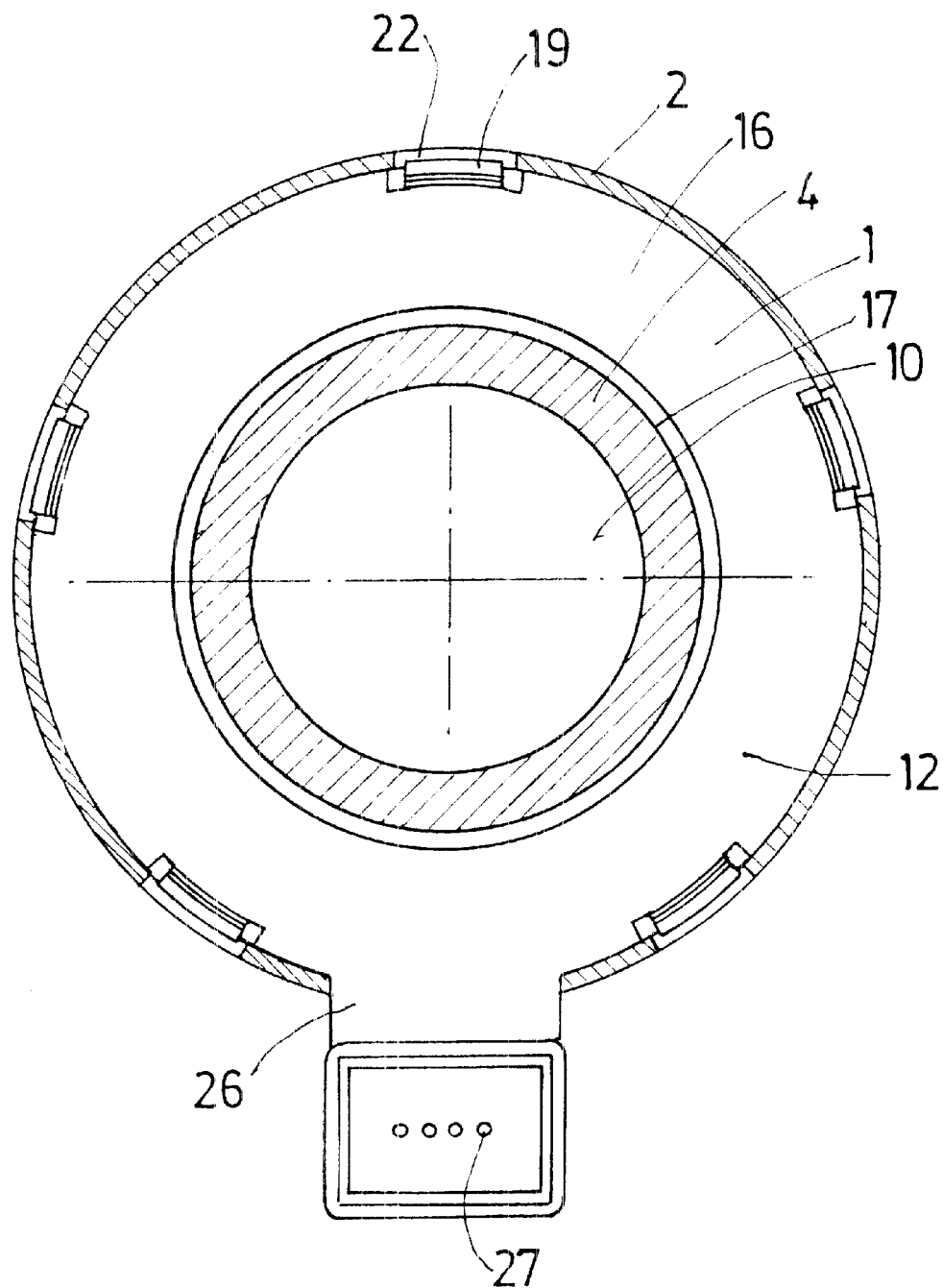
FIG. 3 is a front view in partial cross section along III of the unit illustrated in FIG. 2.

In FIGS. 1 to 3, a unit is illustrated which consists of bearing 1 equipped with a data sensor device and housing 2 inside which said bearing 1 is coupled so as to be attached.

Bearing 1 consists of fixed outer collar 3 coupled to housing 2, turning inner collar 4, and rolling bodies 5 positioned between them in order to permit the relative rotation of the two collars around axis 6.

Coupling is understood to mean that bearing 1 is forcibly inserted into housing 2, with the upper surface of fixed collar 3 attached to the inner surface of housing 2.

In the description, the terms "outer" and "inner" are defined in relation to a plane that is, respectively, opposite and facing axis 6; the terms "axial" and "crosswise" are defined in relation to a plane parallel to axis 6; the terms "radial" and "lateral" are defined in relation to a plane perpendicular to axis 6; the terms "front" and "rear" are defined in relation to references Av and Ar indicated in the figures; and dimensions measured along axis 6 or perpendicular to it are referred to, respectively, as "axial" or "radial".

In the illustrated modes of embodiment, bearing path 7, 8 is traveled, respectively, on the inner surface of fixed collar 3 and the outer surface of turning collar 4, and the bearing is provided by a set of balls 5 that are maintained equidistant by means of casing 9.

Such bearings 1 are, for example, used to ensure rotation of a steering column or of the wheels of an automobile. To that end, inner collar 4 has opening 10 designed to house the steering column or the wheel hub.

When one wishes to know the speed of rotation, direction of movement, and/or angular position of turning collar 4 in relation to fixed collar 3, it is a known technique to use a data sensor device consisting of coder 11 that generates magnetic impulses and is attached to turning collar 4 and, attached to fixed collar 3, sensor 12 equipped with at least two sensitive components 13 capable of detecting the impulses.

This type of data, after electronic processing of the type described, for example, in document FR-2 792 380, is conventionally used in driving assistance systems such as power steering or anti-lock brake systems.

In a specific example, coder 11 consists of a multipolar ring of synthetic material doped with ferrite particles forming a number of contiguous fields in which the magnetism of a given field is inverted in relation to the two fields contiguous to it.

In the illustrated modes of embodiment, coder 11 is cast into the working mold for annular and radial cylindrical seat 14a of frame 14. Frame 14 also consists of annular and axial cylindrical seat 14b attached, by coupling, for example, to the outer surface of inner collar 4. This mode of embodiment permits the joint rotation of coder 11 and inner collar 4.

In the illustrated modes of embodiment, housing 2 is cylindrical, with an inner diameter that is roughly equal to the outer diameter of outer collar 3 in order to permit bearing 1 to be coupled and radially locked inside housing 2.

In a specific example, housing 2 is formed in the steering tube so as to constitute an integral part of it, with bearing 1 permitting the steering column to be axially and radially locked as well to rotate inside said tube.

To that end, housing 2 may be made of a section of tube or in a section of tube, by tooling or deformation of the tube, for example.

Housing 2 has a first means to axially lock the bearing 1 in one direction, which consist of shoulder 15 whose inner diameter is less than the outer diameter of outer collar 3.

Therefore, when bearing 1 is inserted into housing 2 from the front, bearing 1 abuts axially against shoulder 15, thereby locking it toward at the back.

In a specific example, sensor 12 consists of at least two sensitive components 13 and a number of aligned sensitive components, for example, which are chosen from among Hall-effect sensors, magnetic resistances, and giant magnetic resistances. According to a known method, such components are capable of detecting the magnetic impulses generated by coder 11 in order to provide signals that are, for example, representative of the speed of rotation, direction of movement, and/or angular position of turning collar 4 in relation to fixed collar 3.

In the modes of embodiment illustrated in the figures, sensor 12 is composed of ring 16 that is concentric to bearing 1, with opening 17 being provided in ring 16 so that it does not interfere with the rotation of turning collar 4. Ring 16 also includes peripheral extension 18 that extends axially forward.

Sensor 12 is made in monoblock construction by casting a plastic material, for example, with sensitive components 13 placed in the mass of ring 16.

Sensor 12 further includes integrated second means to lock bearing 1, with this second means being designed to work with the additional means provided in housing 2 in order to ensure that bearing 1 is locked at least toward the back.

In the illustrated modes of embodiment, the second locking means consists of a number of elastic tabs 19 regularly distributed on the outer crosswise surface of sensor 12. Tabs 19 are shaped so that they attach to sensor 12 by their rear edge 19a, with their front end 19b projecting radially outward from the surface of said sensor 12.

Tabs 19 are capable of being bent back more or less along the plane of sensor 12 in order to permit bearing 1 to be coupled into housing 2, and then to redeploy radially due to the elasticity of the material used to make sensor 12.

In the first mode of embodiment, tabs 19 are provided to extend axially toward the rear of extension 18 by extending radially beyond the outer crosswise surface of said extension 18. In order to allow tabs 19 to lie back, beveling 20 is provided on the outer crosswise surface of ring 16, a least in the area facing tabs 19.

In the second mode of embodiment, tabs 19 are identical to those in the first mode of embodiment except that beveled housing 21 is provided so as to face the respective tabs 19 and allow them to lie back when bearing 1 is inserted into housing 2.

In the illustrated modes of embodiment, the additional means consist of hollow parts 22 designed to receive said respective radially deployed tabs 19, with said hollow parts 22 being regularly distributed in housing 2. Therefore, axial locking between front end 19b of a tab 19 and rear lateral surface 22a of a hollow part 22 permits bearing 1 to be locked toward the front inside housing 2.

When bearing 1 is inserted into housing 2, tabs 19 come into contact with the inner surface of housing 2, which causes them to lie back radially and to thereby permit coupling; then, when tabs 19 are opposite hollow parts 22, they deploy to ensure that bearing 1 is locked axially.

To that end, the distance between shoulder 15 and hollow parts 22 is designed to axially lock bearing 1 and sensor 12 without any play, with sensitive components 13 more or less being opposite and at a distance from coder 12.

In addition, the respective widths of tabs 19 and hollow parts 22 may be more or less equal to ensure that bearing 1 is prevented from rotating inside housing 2.

In one mode of embodiment not illustrated, the additional means consist of an annular groove cut into the inner surface of the housing to receive said radially deployed tabs 19 and permit the front end of the tabs to lock axially with the rear lateral surface of the groove.

According to these two modes of embodiment, the coupling of bearing 1 into housing 2 is practically irreversible since any backward movement of bearing 1 is checked.

In the first mode of embodiment (FIG. 1), the length of extension 17 is designed so that when it rests against front lateral surface 23 of fixed collar 3, it permits sensitive components 13 to be positioned opposite and at a distance from coder 11.

To that end, front lateral surface 23 has no special tooling to permit sensor 12 with sensitive components 13 to be held or positioned at a distance from coder 11.

In this mode of embodiment, the backward axial locking of bearing 1 and sensor 12 is provided between front lateral surface 23 and the rear lateral surface of extension 18. Thus, sensor 12 forms an axial stop for bearing 1.

In the second mode of embodiment (FIGS. 2 and 3), sensor 12 and outer collar 3 constitute reciprocal attachment means.

The attachment means consist of pins 24 that extend radially backward from extension 18 and groove 25 provided in the outer crosswise surface of fixed collar 3 to receive said pins 24, while positioning sensitive components 13 opposite and at a distance from coder 11.

Thus, before bearing 1 is inserted into housing 2, sensor 12 is attached to fixed collar 3, then the unit is inserted into housing 2 to be locked.

According to this mode of embodiment, the locking is transmitted between sensor 12 and outer collar 3 by the attachment means, with sensor 12 also forming an axial stop for bearing 1.

In the illustrated modes of embodiment, sensor 12 includes radial housing 26 designed to receive input/output interfacing 27 of sensor 12, in the form of a connector or multifiber cable, for example.

Housing 2 accordingly includes axial cut 28, the size of which is designed to receive radial housing 26 to ensure that bearing 1 is prevented from rotating inside housing 2.

In addition, this mode of embodiment makes it possible to orient the insertion of bearing 1 inside housing 2 by positioning tabs 19 opposite hollow parts 22.

Therefore, the unit according to the invention, securely and with no additional parts, ensures, on the one hand, that bearing 1 is locked axially and radially and is prevented from rotating inside housing 2, and on the other hand, that sensor 12 is so attached to bearing 1 that sensitive components 13 are opposite and at a distance from coder 11.

In fact, on the one hand, the applied locking effort is limited only by the strength of the material used to make sensor 12 since it forms a mechanical stop for bearing 1; on the other hand, any relative movement of sensor 12 in relation to outer collar 3, and accordingly to coder 11, is prevented.

In the modes of embodiment illustrated in the figures, bearing 1 is made watertight at its back surface by means of elastomer lip 29 that abuts against inner collar 4. To do so, lip 29 is cast into the working mold of frame 30 that is attached, for example, by clipping into groove 31 provided on the inner surface of outer collar 3.

The front surface is made watertight due to the relative positioning of frame 14 and ring 16. In fact, they form a baffle that prevents the bearing from being polluted and lubricant leaks. In particular, sensor 12 protects coder 11 by covering its entire periphery in order to prevent the entry of pollutants.

However, other watertight means may be provided, such as casings including axial extensions that cover the collars and act as deflectors or, particularly for bearings for alternating movements, the use of a solid lubricant of the type described in document FR-2 760 055.

In addition, in order to improve watertightness on the front side, a watertight lip of the kind described above may be used to cover the frame seat.

What is claimed is:

1. A unit consisting of a bearing equipped with a data sensor device and a housing in which said bearing is coupled, in which:
   said bearing consists of an inner turning collar designed to be attached to a turning body, an outer fixed collar coupled to the housing, and rolling bodies positioned between them;
   said data sensor device consists of a coder that generates magnetic impulses attached to the turning collar and, attached to the fixed collar, a sensor equipped with at least two sensitive components capable of detecting such impulses;
   said housing is designed to permit said bearing to be locked radially;
   said housing has first means to axially lock the bearing in one direction;
   with said unit being characterized in that the sensor is made in monoblock construction with second means to lock the bearing, with the second means being designed to work with additional means provided in the housing to ensure that the bearing is locked in at least the other axial direction.

2. A unit according to claim 1, characterized in that the second locking means consist of a number of elastic tabs that are formed on the outer crosswise surface of sensor, with said tabs having their front end projecting radially outward from the surface of the sensor and being capable of bending back so as to be more or less in the plane of said surface in order to permit the bearing to be coupled in the housing, then to radially redeploy due the elasticity of the material used to make the sensor.

3. A unit according to claim 2, characterized in that the additional means consist of hollow parts provided to receive the respective radially deployed tabs, so as to permit axial locking between the front end of a tab and the rear lateral surface of a hollow part.

4. A unit according to claim 3, characterized in that the respective widths of the tabs and hollow parts are more or less equal to ensure that the bearing is prevented from rotating inside the housing.

5. A unit according to claim 2, characterized in that the additional means consist of an annular groove cut into the inner surface of the housing to receive said radially deployed tabs, providing an axial lock between the front end of the tabs and the rear lateral surface of the groove.

6. A unit according to claim 1, characterized in that the sensor and the outer collar consist of mutual attachment means.

7. A unit according to claim 6, characterized in that the sensor includes a ring that is concentric to the bearing in which the sensitive components are placed, as well as a peripheral extension that extends axially backward, with the attachment means consisting of at least two pins that extend axially toward the rear of the extension and a groove provided on the outer crosswise surface of the fixed collar to receive the pins while positioning the sensitive components opposite and at a distance from the coder.

8. A unit according to claim 1, characterized in that the sensor includes a radial housing for the input/output interfacing of the sensor.

9. A unit according to claim 8, characterized in that the housing consists of an axial cut the size of which is designed to receive the radial housing, thereby preventing the bearing from rotating inside the housing.

10. A unit according to claim 1, characterized in that the sensitive components are chosen from among Hall-effect sensors, magnetic resistances, and giant magnetic resistances.

11. A unit according to claim 1, characterized in that the coder consists of a multipolar ring of a synthetic material doped with ferrite particles forming a number of contiguous fields in which the magnetism of a given field is inverted in relation to the two fields contiguous to it.

12. An automobile steering system consisting of a steering column coupled to the inner collar of a unit according to claim 1 and a steering tube receiving said column in rotation, with said system being characterized in that the housing is formed in the tube.

* * * * *